(12) United States Patent
Ormel et al.

(10) Patent No.: US 7,363,808 B2
(45) Date of Patent: Apr. 29, 2008

(54) METHOD, SYSTEM AND COMPUTER PROGRAM PRODUCT FOR NACELLE WIND SPEED CORRECTION

(75) Inventors: Frank T. Ormel, Hengelo (NL); Alexander Donth, Neuruppin (DE); Thomas Siebers, Neuenkirchen (DE); Clement Faucherre, Paris (FR); Henning Luetze, Bad Bentheim (DE)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 11/295,275

(22) Filed: Dec. 5, 2005

(65) Prior Publication Data

US 2007/0125165 A1   Jun. 7, 2007

(51) Int. Cl.
*G01W 1/00* (2006.01)

(52) U.S. Cl. .................. 73/170.01; 73/1.29; 73/861.85

(58) Field of Classification Search ...............
73/170.01–170.15, 861.79–861.85, 1.29
See application file for complete search history.

(56) References Cited

U.S. PATENT DOCUMENTS

| 4,147,057 A * | 4/1979 | Palmer | 73/861.85 |
| 4,522,070 A * | 6/1985 | Hagen | 73/384 |
| 6,705,158 B1 * | 3/2004 | Louden | 73/170.12 |

FOREIGN PATENT DOCUMENTS

JP           03152469 A  *  6/1991

* cited by examiner

*Primary Examiner*—Andre J. Allen
*Assistant Examiner*—Jermaine Jenkins
(74) *Attorney, Agent, or Firm*—Cantor Colburn LLP

(57) ABSTRACT

A technique for correcting measurement error in data produced by a nacelle-based anemometer and for determining free stream wind speed for a wind turbine involves ascertaining parameters related to the wind turbine and the operation thereof, and using the parameters and data from the nacelle based anemometer as inputs to an algorithm to provide for determination of corrected wind speed data.

13 Claims, 9 Drawing Sheets

METHOD, SYSTEM AND COMPUTER PROGRAM PRODUCT FOR NACELLE WIND SPEED CORRECTION

BACKGROUND OF THE INVENTION

The teachings herein relate generally to a method for correcting error in nacelle measured wind speed for a wind driven turbine.

Wind driven turbines are increasingly relied upon to help alleviate society's increasing demand for energy. Accordingly, sophisticated techniques are called for to ensure reliable operation and optimum performance of each wind turbine in service. Thus, accurate assessments of wind speed are desired to help address the demand for energy.

One technique for making accurate assessments of wind speed involves the use of a separate meteorological mast. This technique calls for placing a separate tower adorned with measurement equipment (for example, an anemometer) some distance upwind of the wind turbine. Although this technique can provide accurate assessments of wind speed, this technique is economically expensive. Further, this technique may not provide the desired accuracy in some cases, such as in complex terrain.

Another technique involves placing an anemometer on the nacelle of the wind driven turbine. Comparison of wind speed measurements taken with a nacelle based anemometer shows that the nacelle based wind speed measurements do not accurately correlate to those measurements taken with equipment upon a meteorological mast. Investigation of this problem has revealed that wind speed measurements taken with a nacelle-based anemometer are influenced by the power production of the wind turbine for any given wind speed. In effect, the indication of wind speed is coupled to the power produced. Unfortunately, existing data acquisition systems assume proportionality between measurements taken with a nacelle-based anemometer and the free stream wind speed. Such systems do not properly account for error, and as a result, application of wind speed data for various operations is not as accurate as can be realized. Accordingly, operations such as turbine optimization are not as effective as possible.

For many reasons, accurate measurements of the free stream wind speed are desired. For example, improved measurements will result in reduced variance and risk in a power curve test. Reduction in or elimination of requirements for site calibration can be realized, thus reducing cost and time expenditures. This can further benefit operators by reducing or eliminating the need for flow correction associated with most terrain variations. Further benefits include, without limitation, improved system optimization, as well as improved accuracy for load planning and performance evaluation.

What is needed is a method to accurately determine ambient wind speed from nacelle based measurement equipment.

BRIEF DESCRIPTION OF THE INVENTION

The above discussed and other drawbacks and deficiencies are overcome or alleviated by the teachings disclosed herein.

Disclosed is a method for determining corrected wind speed data for a wind driven turbine comprising a nacelle based anemometer, that includes measuring wind speed with the anemometer to produce uncorrected wind speed data; receiving the uncorrected wind speed data in a processing unit; obtaining values for parameters for the turbine operation by at least one of measuring the parameter values and selecting predetermined parameter values; and, processing the uncorrected wind speed data and the values with the processing unit to determine the corrected wind speed data.

Also disclosed is a system for producing corrected wind speed data for a wind turbine having a nacelle based anemometer, which includes at least one sensor for measuring at least one operational condition of the wind turbine and producing at least one dynamic value, wherein the at least one sensor comprises the nacelle based anemometer for producing uncorrected wind speed data; and a processing unit coupled to the at least one sensor, the processing unit comprising memory for storage of an algorithm and storage of at least one predetermined static value, wherein the processing unit receives the wind speed data and the at least one dynamic value and produces the corrected wind speed data using the uncorrected wind speed data and at least one of the static value and the dynamic value as inputs to the algorithm.

Further disclosed is a computer program product stored on machine readable media, the product providing instructions for determining corrected wind speed data for a wind driven turbine having a nacelle based anemometer, by measuring wind speed with the anemometer to produce uncorrected wind speed data; receiving the uncorrected wind speed data in a processing unit; obtaining values for parameters for the turbine operation by at least one of measuring the parameter values and selecting predetermined parameter values; and, processing the uncorrected wind speed data and the values with the processing unit to determine the corrected wind speed data.

Also further disclosed is a system for producing corrected wind speed data for a wind turbine comprising a nacelle based means for measuring wind speed, the system including means for obtaining at least one operational condition of the wind turbine, the at least one operational condition including at least uncorrected wind speed data; and, processing means coupled to the obtaining means, the processing means having means for receiving at least one value for the at least one operational condition and further including means for producing corrected wind speed data using the at least one value.

The features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures, wherein.

DETAILED DESCRIPTION THE INVENTION

Figure 1:
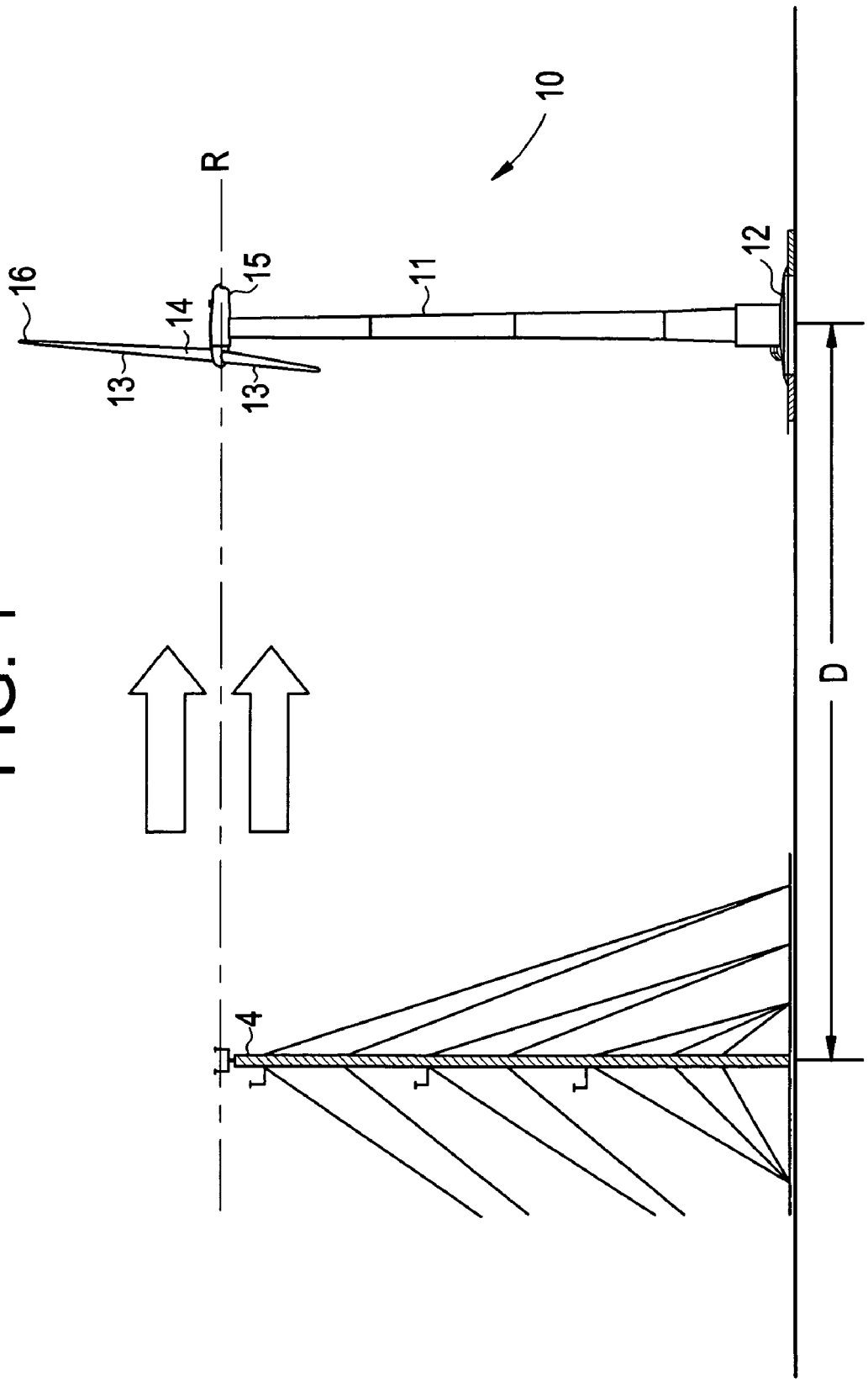
FIG. 1 illustrates aspects of a wind driven turbine.

Referring to FIG. 1, there is shown an exemplary wind driven turbine 10. In this embodiment, the turbine 10 includes a tower 11 having a base 12 for securing the turbine 10 the terrain. At least one to many rotor blades 13, each one having a root 14 and a tip 16, are coupled to a nacelle 15 that is in turn coupled to the tower 11. During operation, wind (illustrated by the arrows pointing from left to the right) impinges upon the rotor blades 13 causing rotation of the rotor blades 13 about an axis of rotation R. In the non-limiting examples discussed herein, the mechanical energy generated by the rotation of the rotor blades 13 is converted by systems within the nacelle 15 to produce electrical output.

Although some embodiments of wind turbines 10 use one rotor blade 13, others use many more rotor blades 13. In typical embodiments, three rotor blades 13 are deployed. Accordingly, this disclosure generally discusses wind turbines 16 in terms of typical embodiments having three rotor blades 13, however, these embodiments are merely illustrative and non-limiting of the teachings herein.

FIG. 1 further depicts equipment used in a prior art techniques for measuring wind speed. Included is a meteorological mast 4. This technique calls for placing the meteorological mast 4 some distance D upwind of the wind turbine 10 and making direct measurements of wind speed. Optimally, the measurement equipment upon the meteorological mast 4 is centered upon the axis of rotation R. Although FIG. 1 depicts a horizontal plane as the axis of rotation R, it is recognized that in typical embodiments, it is the height of a rotor hub that is comparable between the wind turbine 10 and the meteorological mast 4. Therefore, aspects of the axis of rotation R depicted are only illustrative and non-limiting of the teachings herein.

Figure 2:
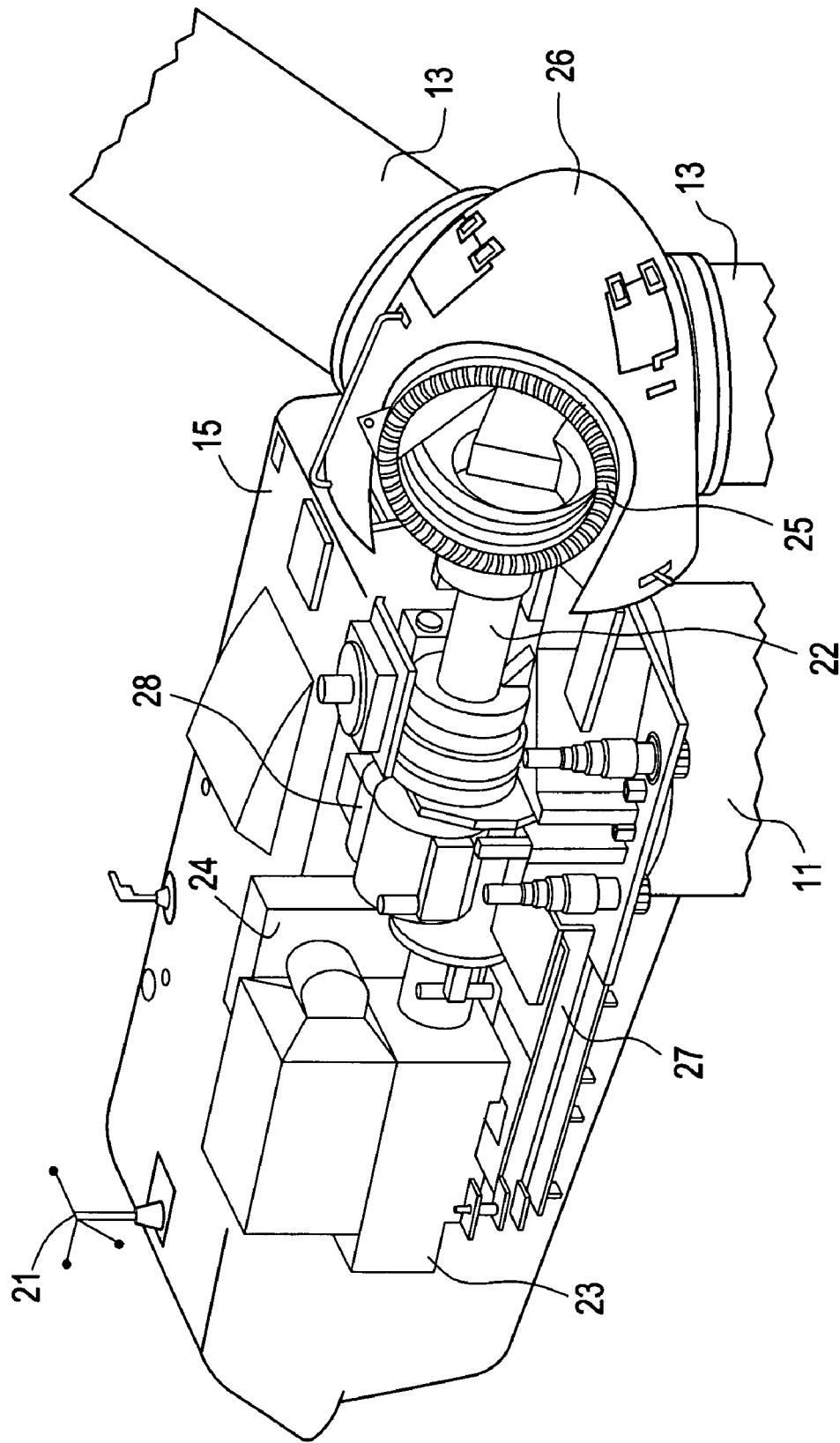
FIG. 2 is a cutaway view of a nacelle of the turbine.

FIG. 2 is a cutaway view of an exemplary nacelle 15 illustrating selected components therein. Shown in FIG. 2 are rotor blades 13 each of which are coupled at the root thereof to a rotor hub 25. A nose cone 26 provides streamlining for the hub 25 and other components. The rotor hub 25 is coupled within the nacelle 15 to a main shaft 22 that drives a gearbox 28 and, in turn, a generator 23. The generator 23 provides a supply of electricity to service an electrical load (not depicted) coupled thereto.

Aspects of the operation of the turbine 10 are managed through control systems internal to a control panel 24. In this embodiment, the foregoing components and various other components are coupled to a main frame 27 within the nacelle 15. It should be noted that some of the various other components depicted in FIG. 2 are considered incidental to the teachings herein. Accordingly, these other components are not introduced nor discussed further herein.

An additional component depicted in FIG. 2 is an anemometer 21. In typical embodiments, the anemometer 21 measures the speed of the wind stream impingent upon the turbine 10. Data collected by the anemometer 21 is typically fed to the control systems. The control systems make use of anemometer data for a variety of purposes. Such purposes include, without limitation, turbine performance evaluation, turbine calibration and turbine optimization. In some embodiments, the anemometer 21 is located on a mast anchored in an aft portion of the nacelle 15, typically in the middle thereof. It should be noted however, that the teachings herein provide for use of anemometer data from anemometers 21 located on or about the nacelle 15. For example, in one embodiment, the anemometer 21 may be mounted upstream of the rotor blades 13. Accordingly, the teachings herein are illustrative only regarding mountings and mounting locations for the anemometer 21 and not limiting thereof.

In order to discuss the teachings herein in a proper context, it is first important to describe aspects of the aerodynamics associated with the wind driven turbine 10. FIGS. 3-6 provide graphic depictions of a standard model for wind flow over a rotor blade 13 that is in use.

Figure 3:
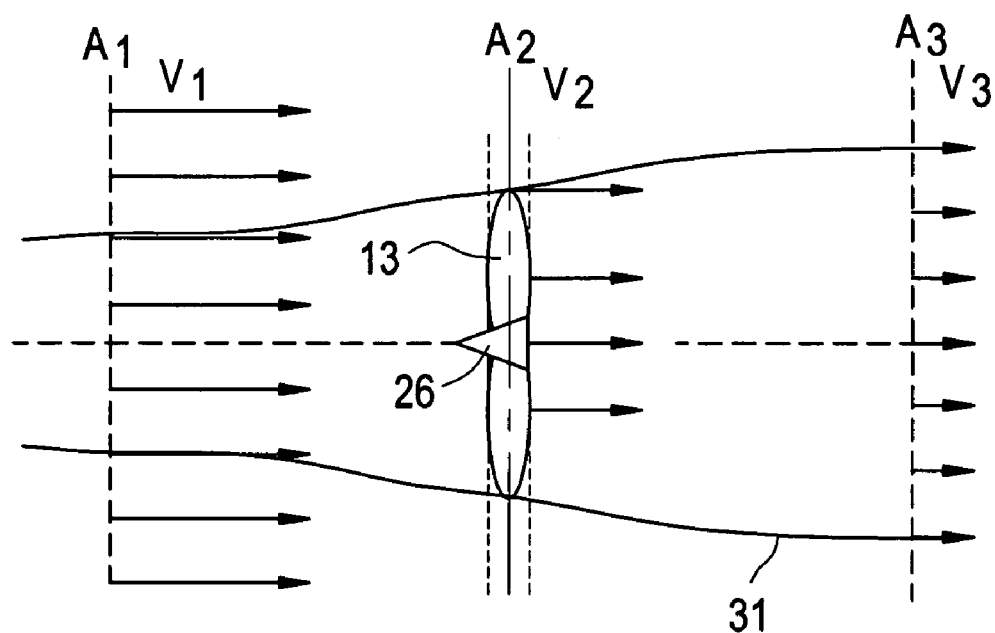
FIG. 3 is a graph depicting properties of wind impingent upon the rotors of the turbine.

FIG. 3 is a graph depicting a stream tube 31 of free wind impingent upon the rotor blades 13 of the turbine 10. The series of arrows pointing from left to right indicate the direction and speed of the wind within the stream tube 31. As shown in FIG. 3, the wind within the stream tube 31 crossing plane $A_1$ has a greater speed than the wind within the stream tube 31 crossing plane $A_2$, which in turn is greater than the speed of the wind within the stream tube 31 crossing plane $A_3$. Note that the stream tube 31 as depicted in FIG. 3 experiences some dispersion as it passes through the plane $A_2$, which contains the rotors blades 13.

Figure 4:
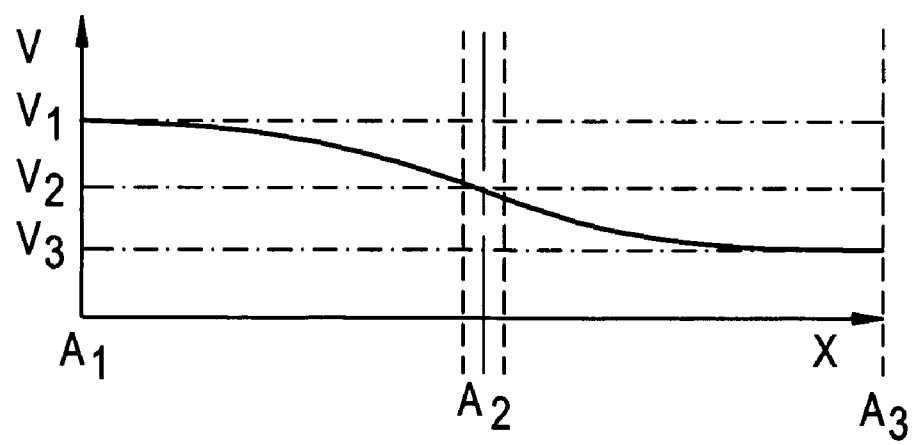
FIG. 4 is a graph depicting wind speed in relation to the turbine.

FIG. 4 similarly depicts the relationship illustrated by the directional arrows presented in FIG. 3. That is, FIG. 4 depicts a decrease in the wind speed as the wind within the stream tube 31 progresses from plane $A_1$ to plane $A_2$ and crosses plane $A_3$.

Figure 5:
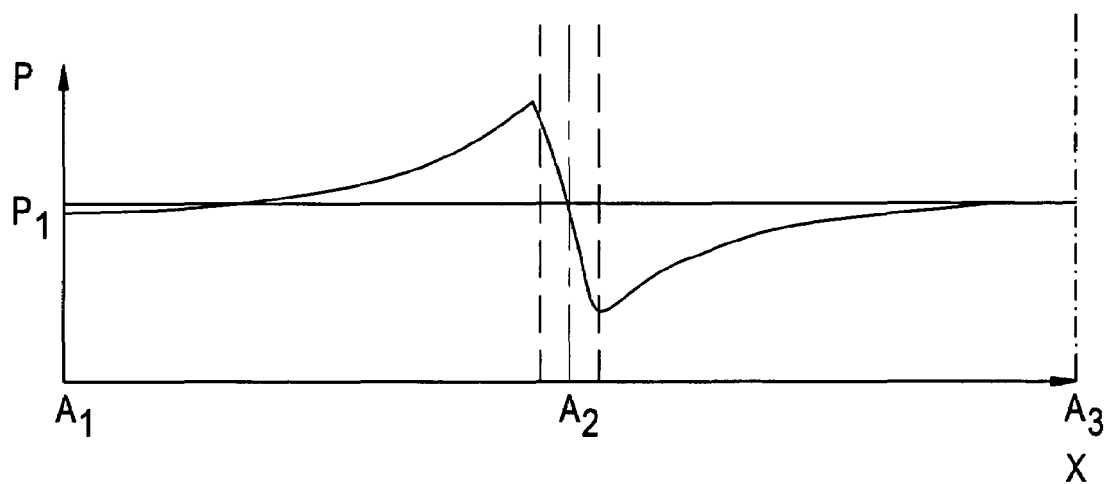
FIG. 5 is a graph depicting static pressure in relation to the turbine.

FIG. 5 depicts changes in the static pressure within the stream tube 31. As shown in FIG. 5, the pressure (P) increases from a nominal value $P_1$ to a maximal value P as the stream tube 31 impinges upon the outer surfaces of the rotor blades 13. The static pressure within the stream tube 31 drops to a minimal pressure as the stream tube 31 exits the plane of the rotor blades 13. At some point (depicted here as plane $A_3$), the static pressure returns to ambient conditions, $P_1$.

When considering optimal locations for measurements of wind speed, one might surmise that placing the anemometer 21 within the stream tube 31 is desirable. Predictably, the effects illustrated in FIGS. 3-5 will have some effect upon measurements taken with an anemometer 21 so positioned.

Typically, rotor blades 13 have a cylindrical section at the root 14, the cylindrical section being aerodynamically inactive. Accordingly, the drag in this section is lower than the drag associated with other sections of the rotor blade 13. The drag associated with the aerodynamically active section of the rotor blade 13 depends on various properties as well as pitch angle. The drag associated with the active portion of the rotor blade 13 leads to a displacement of wind flow toward the tip 16 as well as toward the root 14. This effect is depicted in FIG. 6.

Figure 6:
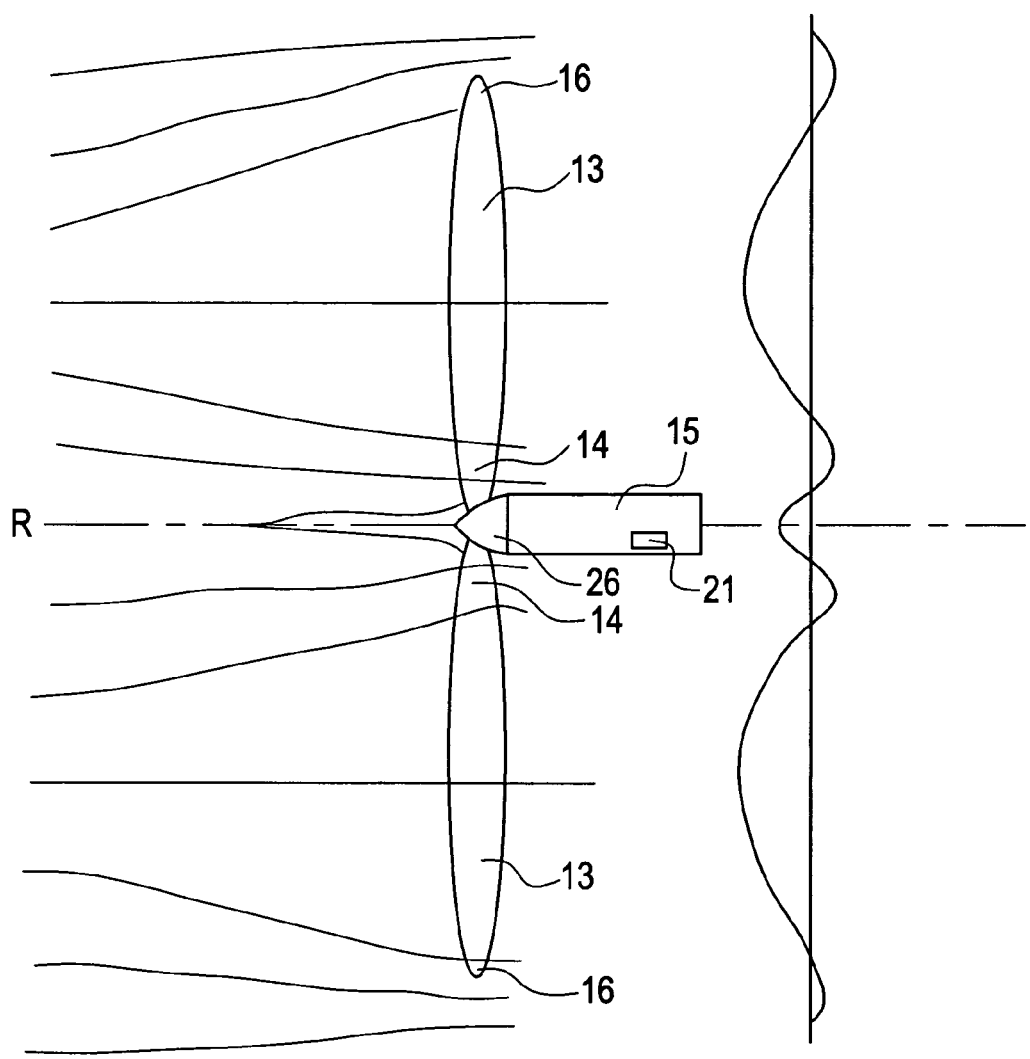
FIG. 6 depicts dispersion of wind entering into the vicinity of the rotor blades.

FIG. 6 depicts some qualitative aspects of wind displacement, including streamlines and velocity. Components of the turbine 10 depicted in FIG. 6 include two rotor blades 13, the nacelle 15 and the nose cone 26. An exemplary axis of rotation for the rotor blades 13 is depicted as a dashed line R, which rotates about the centerline of the rotor hub 25. Solid lines depict the displacement of wind in the stream tube 31 as the wind approaches the rotor blades 13. As a result, the speed of the wind flow is increased at the position of the anemometer 21 (near the axis of rotation R). The increase in wind flow as a function of $C_p$ (the power coefficient) and $C_t$ (the thrust coefficient), wherein these quantities are defined as:

$$C_p = \frac{\text{Power}}{0.5 * \rho * v^3 * A} \quad \text{(Eq. 1)}$$

$$C_t = \frac{\text{Thrust}}{0.5 * \rho * v^2 * A} \quad \text{(Eq. 2)}$$

wherein (Power) represents electrical output and is preferably measured after the generator 23 and before a transformer;

(Thrust) represents the wind force upon the rotor in the direction of the flow;

(ρ) represents the density of air;

(v) represents the free stream wind speed; and, (A) represents the swept area of the rotor blades 13.

Also referring to FIG. 6, there is shown and exemplary wind speed profile across the rotor blade 13. The wind speed profile shown illustrates that the wind speed is greatest near the tips 16 and also near the root 14 for each of the rotor blades 13.

Figure 7:
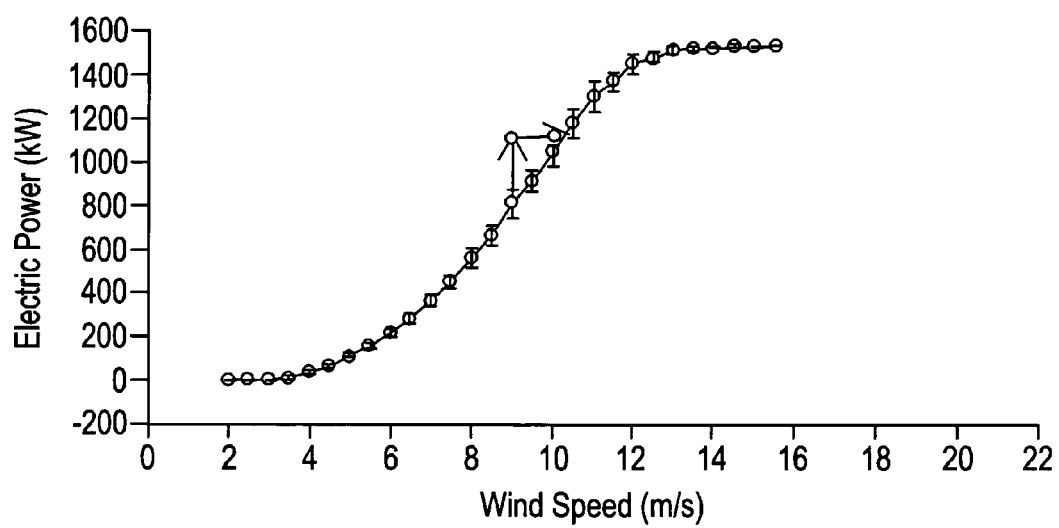
FIG. 7 depicts an exemplary power curve for a wind turbine.

Referring to FIG. 7, an exemplary power curve for a wind turbine 10 is shown, illustrating problems with using uncorrected wind speed data produced with a nacelle-based anemometer. In this example, an improvement in $C_p$ results in higher power output at a certain wind speed. This improvement is illustrated by the upward arrow (indicated at the wind speed of 9 meters/second). Incorrectly, and due to the effective coupling of power and indicated wind speed, an increased wind speed is indicated, as illustrated by the horizontal arrow. Accordingly, the wind speed data would erroneously indicate the results of efforts to optimize the wind turbine 10.

Accordingly, it can be recognized that the wind speed measurement obtained at the location of the nacelle-based anemometer 21 depends on various static and dynamic factors. Non-limiting examples of the various factors include flow distortion due to the nacelle 15 as well as the rotor blades 13. It should also be recognized that the properties of the wind speed sensor (anemometer 21) used might influence the measurement results. A non-limiting example of a dynamic factor includes aerodynamic properties of the rotor blade 13. The aerodynamic properties are, in turn, dependent upon other qualities. Non-limiting examples of such other qualities include the type of rotor blade 13 and the surface conditions of the rotor blade 13.

Accordingly, one technique to correct for the effects of the various influences upon wind speed measured with a nacelle based anemometer calls for use of the following empirically derived formula:

$$V_{nacelle,corrected} = \left( \frac{a - \sqrt[3]{C_p}}{b} \right) * V_{nacelle,measured} + c, \quad \text{(Eq. 3)}$$

wherein:

(a), (b) and (c) represent values associated with aspects of the turbine and operation thereof.

The values (a), (b) and (c) may either be constants or variables. Non-limiting examples of constant values include those that are derived from the type of rotor blade 13 used and those derived from aspects of the anemometer 21 employed. A non-limiting example of a variable value is one derived from a function that considers turbulence.

One skilled in the art may surmise that a variety of sensors may be used to collect data for the derivation of the values (a), (b) or (c). For example, sensors could be used to provide for estimations of strain or deflection of each rotor blade 13, the rotor hub 25, the main shaft 22 and the tower 11.

Figure 8:
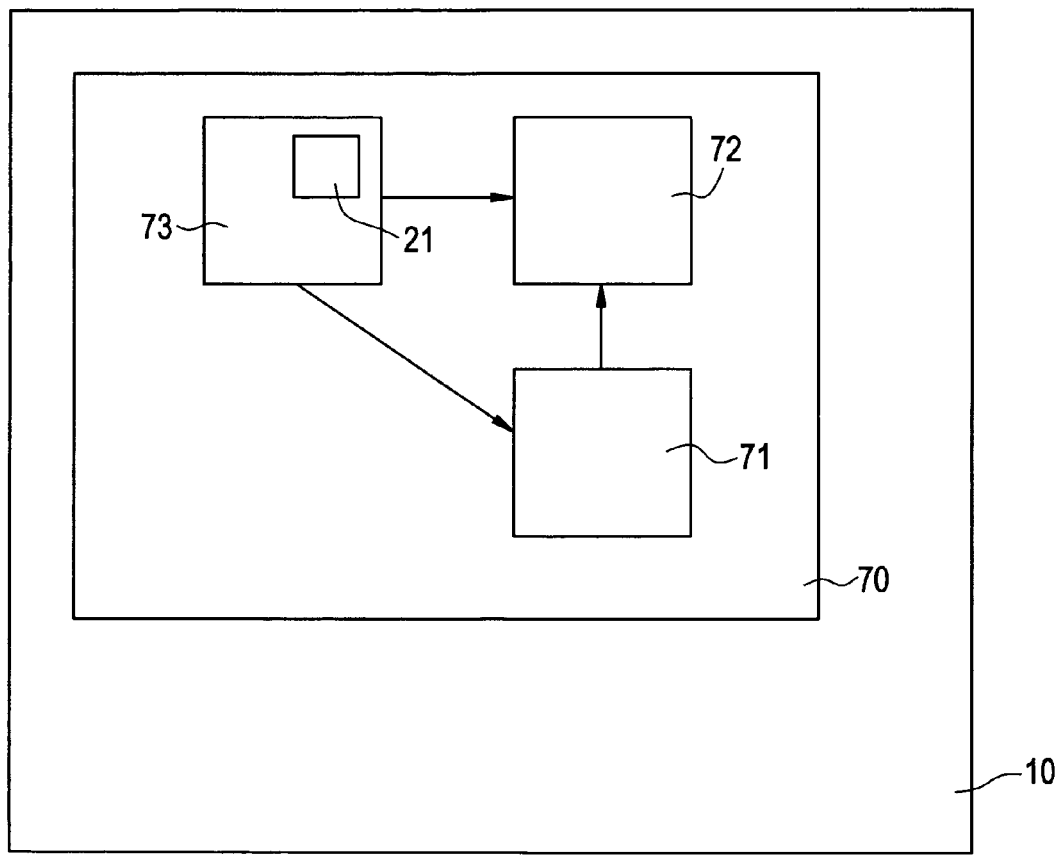
FIG. 8 depicts aspects of a processing unit for producing corrected wind speed data.

Referring to FIG. 8, there is shown a system 70 for processing wind speed data and values associated with operation of the turbine 10. In the embodiment depicted, the system 70 includes a processing unit 71, at least one sensor 73 and at least one parameter 72. The processing unit 71 may include devices commonly used for data processing, including, without limitation, a central processing unit (CPU), memory, data storage facilities, network interface facilities, and other components as may be typically used for real time data processing. Shown separately from the processing unit 71 is at least one sensor 73. Preferably, the at least one sensor 73 provides for monitoring of at least one operational condition (i.e., operational parameter 72) of the turbine 10 at intervals deemed suitable by an operator of the wind turbine 10 (e.g., monitoring occurs on a basis that is continuous, frequent or periodic). Non-limiting examples of operational parameters 72 include ambient meteorological conditions such as pressure, temperature and humidity, as well as others such as power, thrust, yaw, misalignment, pitch and rotational speed.

In one embodiment, the processing system 70 includes a computer program product for implementation of the teachings herein. In another embodiment, an individual manually computes corrected wind speed data. In this embodiment, certain aspects (such as the processing unit 71) may not be required for generation of corrected wind speed data. This latter embodiment may be useful where ambient production conditions are relatively static and periodic assessments meet operational needs.

Figure 9:
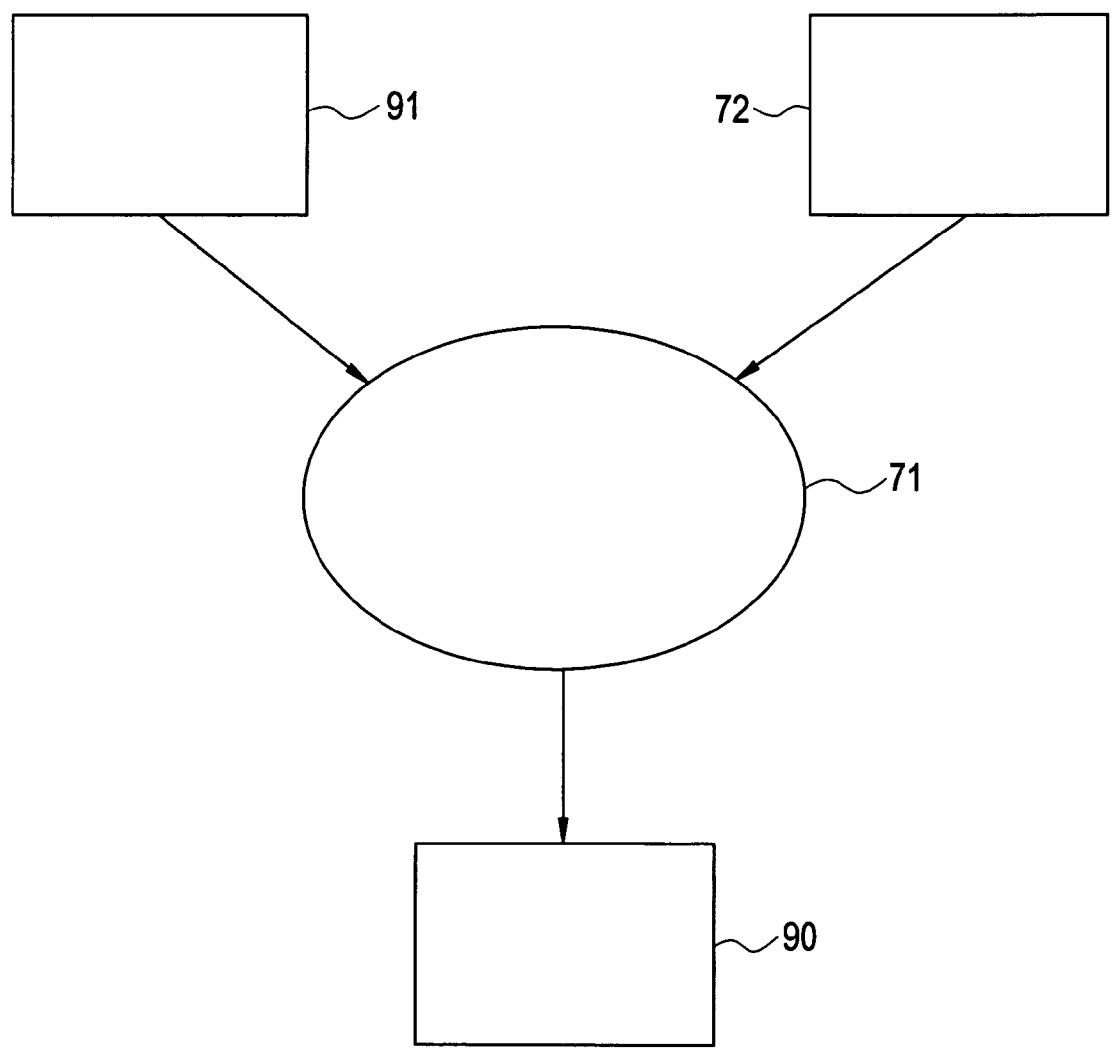
FIG. 9 depicts an exemplary process for producing corrected wind speed data; and, FIG. 10 is a graph depicting uncorrected wind speed data and corrected wind speed data for an exemplary set of measurements.

FIG. 9 depicts an exemplary process for producing the corrected wind speed data 90. In FIG. 9, uncorrected wind speed data 91 and operational parameters 72 are used as inputs to the processing unit 71. Using the inputs, the processing unit 71 produces corrected wind speed data 90. In preferred embodiments, the corrected wind speed data 90 is at least one of stored in data storage and routed to a network interface for external use.

Evaluation of the appropriateness of wind speed correction determinations can be realized through comparison of corrected wind speed data to wind speed data collected at a separate meteorological mast 4. Evaluation has shown that a linear correlation to mast based wind speeds may be realized in accordance with the teachings disclosed herein.

Figure 10:
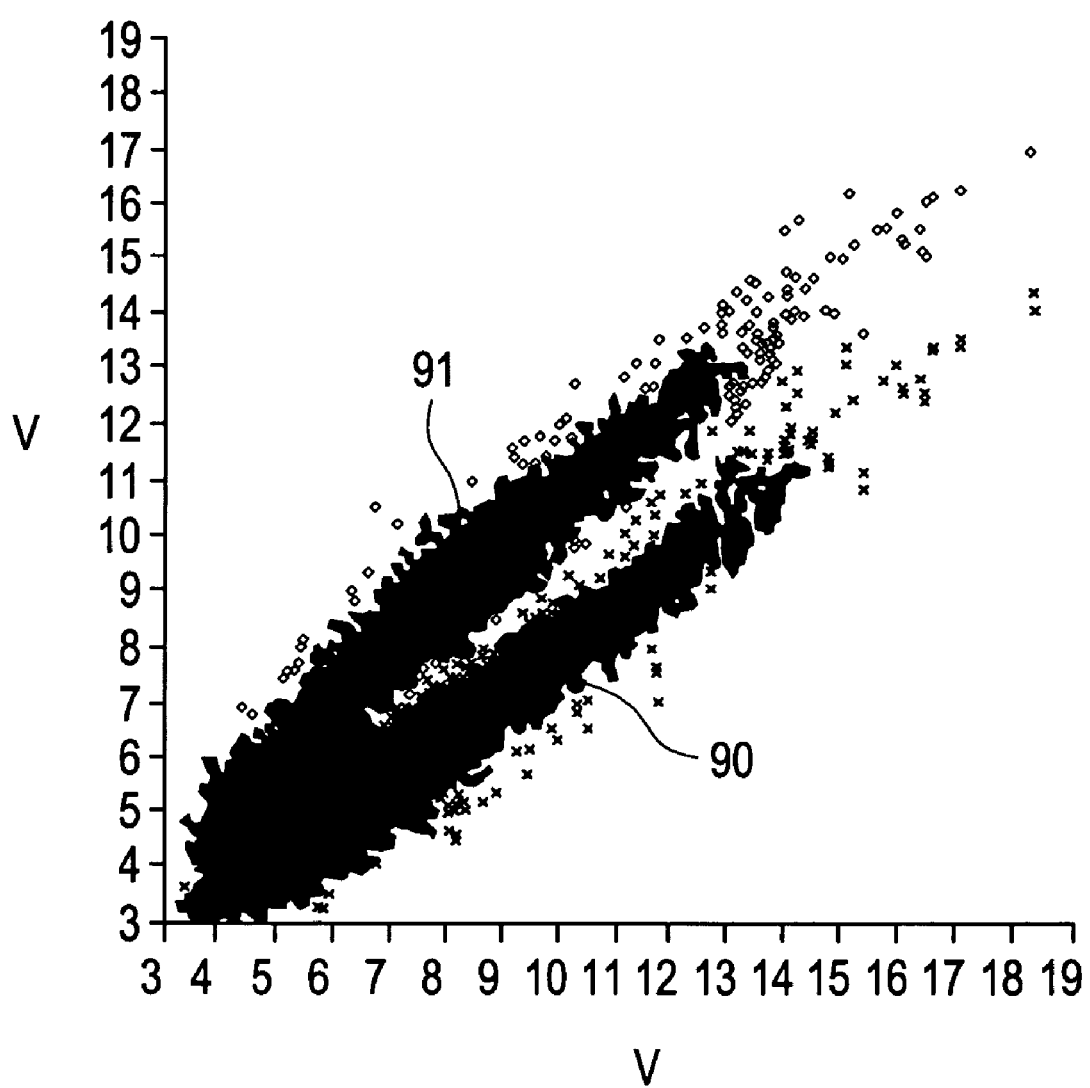

FIG. 10 provides a comparison of uncorrected wind data and corrected wind data for an exemplary set of measurements. In FIG. 10, the graph generally depicts two sets of data. The upper set corresponds to uncorrected wind speed data 91, while the lower data grouping corresponds to corrected wind speed data 90.

Accordingly, the teachings herein provide the technical effect of removing bias from prior art wind speed determinations using data from nacelle-based anemometers 21, thus reducing variability in power curve measurements. This provides users with needed information to complete adjustments to correct various parameter settings, pitch, yaw misalignment, etc, . . . (wind turbine 10 optimization) while relying upon power data and indicated wind speed data.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for determining corrected wind speed data for a wind driven turbine comprising a nacelle based anemometer, the method comprising:
   measuring wind speed with the anemometer to produce uncorrected wind speed data;
   receiving the uncorrected wind speed data in a processing unit;
   obtaining values for parameters for the turbine operation by at least one of measuring the parameter values and selecting predetermined parameter values; and,
   processing the uncorrected wind speed data and the values with the processing unit to determine the corrected wind speed data.

2. The method as in claim 1, wherein the parameters comprise at least one of operational properties, aerodynamic properties and physical properties.

3. The method as in claim 2, wherein the operational properties comprise at least one of rotational speed and generator output.

4. The method as in claim 2, wherein the aerodynamic properties comprise at least one of rotor deflection, yaw-misalignment and rotor pitch.

5. The method as in claim 2, wherein the physical properties comprise at least one of barometric pressure, temperature, humidity, component strain and component stress.

6. The method as in claim 1, wherein the parameters are derived from components comprising at least one of:
   the turbine, a mounting tower, a rotor blade, a rotor hub, a rotor main shaft, the nacelle, the nacelle based anemometer and surrounding terrain.

7. A system for producing corrected wind speed data for a wind turbine comprising a nacelle based anemometer, the system comprising:
   at least one sensor for measuring at least one operational parameter of the wind turbine and producing at least one dynamic value, wherein the at least one sensor comprises the nacelle based anemometer for producing uncorrected wind speed data;
   a processing unit coupled to the at least one sensor, the processing unit comprising memory for storage of an algorithm and storage of at least one predetermined static value, wherein the processing unit receives the uncorrected wind speed data and the at least one dynamic value and produces the corrected wind speed data using the uncorrected wind speed data and at least one of the static value and the dynamic value as inputs to the algorithm.

8. The system as in claim 7, wherein the at least one sensor comprises at least one sensor adapted for measuring at least one of ambient meteorological conditions, power, thrust, rotational speed, yaw-misalignment, pitch, strain and deflection.

9. The system as in claim 7, wherein the algorithm comprises a relationship:

$$V_{nacelle, corrected} = \left(\frac{a - \sqrt[3]{C_p}}{b}\right) * V_{nacelle, measured} + c, \text{ wherein}$$

$V_{nacelle, corrected}$ represents the corrected wind speed data;
a represents at least one of the static value and the dynamic value;
b represents at least one of the static value and the dynamic value;
$C_p$ represents a coefficient of power for the wind turbine;
$V_{nacelle, measured}$ represents the uncorrected wind speed data; and,
c represents at least one of the static value and the dynamic value.

10. The system as in claim 7, wherein the corrected wind speed data comprises a linear relationship to free stream wind speed measured upstream of the wind turbine.

11. A computer program product stored on machine readable media, the product comprising instructions for determining corrected wind speed data for a wind driven turbine comprising a nacelle based anemometer, by measuring wind speed with the anemometer to produce uncorrected wind speed data; receiving the uncorrected wind speed data in a processing unit; obtaining values for parameters for the turbine operation by at least one of measuring the parameter values and selecting predetermined parameter values; and, processing the uncorrected wind speed data and the values with the processing unit to determine the corrected wind speed data.

12. The computer program product as in claim 11 further comprising instructions for at least one of storing and routing the corrected wind speed data.

13. A system for producing corrected wind speed data for a wind turbine comprising a nacelle based means for measuring wind speed, the system comprising:
   means for obtaining at least one operational condition of the wind turbine, the at least one operational condition comprising at least uncorrected wind speed data; and,
   processing means coupled to the obtaining means, the processing means comprising means for receiving at least one value for the at least one operational condition and further comprising means for producing corrected wind speed data using the at least one value.

* * * * *